United States Patent [19]

Mishima

[11] 4,243,903

[45] Jan. 6, 1981

[54] PERMANENT MAGNET STATOR FOR A DC DYNAMO ELECTRIC MACHINE USING BLOCKING MAGNETS

[75] Inventor: Matsuo Mishima, Tokyo, Japan

[73] Assignee: Micro Technology Laboratory Co., Ltd., Japan

[21] Appl. No.: 948,208

[22] Filed: Oct. 3, 1978

[30] Foreign Application Priority Data

Oct. 6, 1977 [JP] Japan ............................ 52-120240

[51] Int. Cl.³ .......................................... H02K 21/28
[52] U.S. Cl. .................................................. 310/154
[58] Field of Search ................................. 310/154–156

[56] References Cited

U.S. PATENT DOCUMENTS

| 3,334,254 | 8/1967 | Kober | 310/156 |
| 3,906,268 | 9/1975 | Graffenried et al. | 310/154 |

FOREIGN PATENT DOCUMENTS

| 2263169 | 6/1974 | Fed. Rep. of Germany | 310/154 |
| 2263170 | 6/1974 | Fed. Rep. of Germany | 310/154 |
| 2305591 | 8/1974 | Fed. Rep. of Germany | 310/154 |
| 2657892 | 7/1977 | Fed. Rep. of Germany | 310/154 |

Primary Examiner—Mark O. Budd
Attorney, Agent, or Firm—Staas & Halsey

[57] ABSTRACT

A permanently magnetic stator for a DC dynamo electric machine which is adapted to define an extremely large air gap between pole pieces disposed face to face with a non-magnetic or substantially non-magnetic columnar solid body rotor. Two main permanent magnets, rectangular in cross section, are disposed opposite to each other on the inside of a square-shaped stator yoke to set up a double-pole magnetic field in the air gap. The pole pieces are plate-like and respectively mounted on the opposed surfaces of the main magnets so that the magnetic field along the center line of the air gap defined between the pole pieces is parallel to leakage magnetic fields formed on both sides of the extremely large air gap between the main magnets. Blocking magnets, each producing a magnetic field reverse in direction but equal in intensity to each leakage magnetic field, are mounted opposite to each other on the inside of the yoke between the main magnets, thereby cancelling the leakage magnetic fields and ensuring a strong magnetic field in the extremely large air gap.

15 Claims, 6 Drawing Figures

PERMANENT MAGNET STATOR FOR A DC DYNAMO ELECTRIC MACHINE USING BLOCKING MAGNETS

BACKGROUND OF THE INVENTION

1. Field of the Invention

This invention relates to a stator for a DC dynamo electric machine which is composed of permanent magnets disposed around a substantially non-magnetic, columnar solid body rotor or a non-magnetic, columnar coreless solid body rotor having a closely stacked winding to provide a strong magnetic field in an extremely large air gap defined between the permanent magnets.

2. Description of the Prior Art

In known various types of DC dynamo electric machines, a magnetic circuit, via the route defined as pole pole piece-air gap-armature-air gap-pole piece is set up by forming a flux path loop of very low reluctance. The armature has a slot core or smooth core, and, in the case of the drag cup type, there is provided a stationary central flux return core.

A very small air gap defined between such an armature core or central core is commonly referred to as a working air gap. Accordingly, as to working air gaps in DC dynamo electric machines, the abovesaid very small air gap is common in the art. However, in a columnar solid body rotor previously proposed by the present applicant, a columnar dust core is affixed to the rotor shaft, a thin cylindrical insulator is disposed around the dust core, and then a rotor winding is mounted on the outer periphery of the insulator in large quantity. In a columnar solid body coreless rotor similarly proposed by the present applicant, a sleeve-like insulator is mounted around a rotor shaft, and a large amount of rotor winding is disposed between the insulator and the outer periphery of the rotor. Both of these rotors are rod-like solid body rotors and have the advantages of large winding capacity, excellent mechanical strength, low inertia and low inductance; therefore these rotors exhibit an excellent control performance, withstand a high-speed rotation and an impulse input and produce a high output.

In the columnar solid body rotor, however, a dust core whose iron loss is substantially negligible is employed, and the equivalent permeability of the rotor winding as a whole is held small. Accordingly the volume-conversion mean permeability $\mu$ of the rotor may be set to a small value as, for instance, 2, in some cases. Since the permeability of the armature core or central core of the prior art DC machines can be considered to be about 800, for example, the permeability $\mu = 2$ of the columnar solid body rotor can be regarded as substantially equal to the space or air gap permeability.

As the columnar coreless solid body rotor is non-magnetic as a whole, the space defined between field poles facing the non-magnetic or substantially non-magnetic rotor can be regarded as an extremely large air gap. Accordingly, the pole piece-to-pole piece magnetic circuit around such a solid body rotor is similar to an open magnetic path which would be formed in a case of the armature core or central core being removed in the known DC machine. With such a pole piece-to-pole piece magnetic circuit, a multipole structure is impossible. The reason is that fluxes are centered at the sides of adjacent pole pieces along paths of shorter distance than that between the centers of the pole pieces, resulting in no effective flux being supplied to the non-magnetic or substantially non-magnetic solid body rotor. As a consequence, the magnetic stator having an extremely large air gap corresponding to such a solid body rotor as mentioned above is limited specifically to the double-pole type.

For applying a strong magnetic field to the extremely large air gap, it is suitable to employ anisotropic barium ferrite, strontium ferrite or like permanent magents of high coercive force.

In the case of forming a magnetic path having an extremely large air gap by using such permanent magnets under a configurational restriction of what is called the configuration-output ratio, excessive leakage flux occurs due to the ratio between the air gap length and the length of a leakage magnetic shunt of the main magnetic path. This makes it difficult to converge field flux on the magnetic pole.

Figure 1:
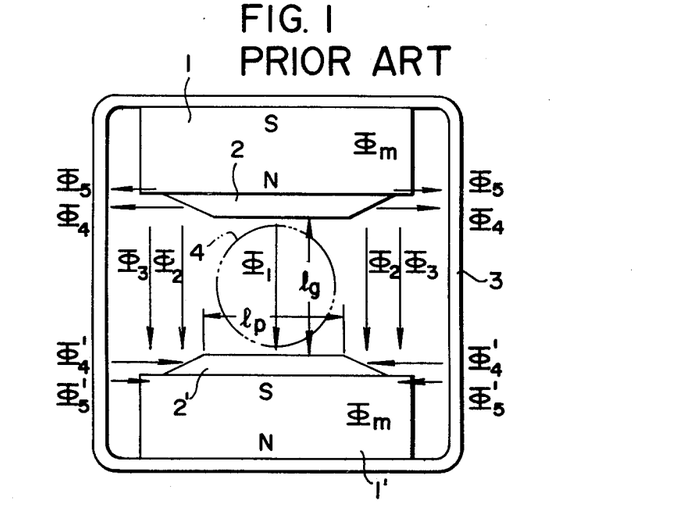
FIG. 1 is explanatory of magnetic paths in a stator for conventional DC dynamo electric machines.

Now, consider such a double-pole structure as shown, for example, in FIG. 1, in which reference numeral 3 indicates a field yoke, 1 and 1' designate main magnets, 2 and 2' identify pole pieces and 4 denotes a columnar coreless solid body rotor. Letting $\Phi_1$ represent the magnetic flux over the entire area of each magnetic pole with that pole area being the product of the magnetic pole with lp corresponding to the rotor and the length of a magnetic path perpendicular to the drawing sheet, $\Phi_2$ represent the magnetic flux between the inclined portions of the magnetic poles, $\Phi_3$ represent the magnetic flux between the end portions of the main magnets, $\Phi_4$ (including $\Phi_4'$ identifying only an opposite direction) represent magnetic flux between each side of the magnetic pole pieces and the yoke, $\Phi_5$ (including $\Phi_5'$ identifying only an opposite direction) represent the magnetic flux between each side of the main magnets and the yoke and $\Phi_m$ represent the overall magnetic flux of each main magnet, it follows that $$\Phi_m = \Phi_1 + 2(\Phi_2 + \Phi_3 + \Phi_4 + \Phi_5)$$

Though differing with the magnetic properties of the main magnets and the magnetic path configuration used, the field flux $\Phi_1$ in an air gap represented in FIG. 1 as lg is as small as, for example, 25% of the overall flux $\Phi_m$. In other words, the flux is almost consumed as leakage flux. This results in a reduced amount of effective flux, introducing many difficulties in the construction of a specific operative magnetic path.

A structure for preventing leakage magnetic field between pole pieces by applying thereto a reverse magnetic field is disclosed in U.S. Pat. No. 3,334,254 issued to Koher. A structure having a plurality of main magnets disposed in contact with pole pieces on many sides is set forth in U.S. Pat. No. 3,906,268 issued to Graffenried.

The structure by Kober is of the type rotating a multipole magnetic field and has the defect that a magnetic field of an additional magnet is set up on the side of a main magnet at an angle of nearly 90° to the direction of the magnetic field of the main magnet. In the Graffenried structure, a plurality of main magnets are efficiently contacted with a many-sided pole piece. These structures are supposed to provide a magnetic circuit, formed via the route pole piece-air gap-armature (stator in the Kober patent)-air gap-pole piece which establishes a flux path of very low reluctance. If the Kober or Graffenried structures were to be applied to the aforementioned non-magnetic or substantially non-magnetic solid rotor (in the case of the Kober patent, a substantially non-magnetic stator) to which this invention is directed, flux emanating from one adjacent pole piece to the other is centered at the portion of the latter along a path of the shortest distance between them, and no effective flux is supplied to the armature (the stator in the Kober patent).

Figure 2:
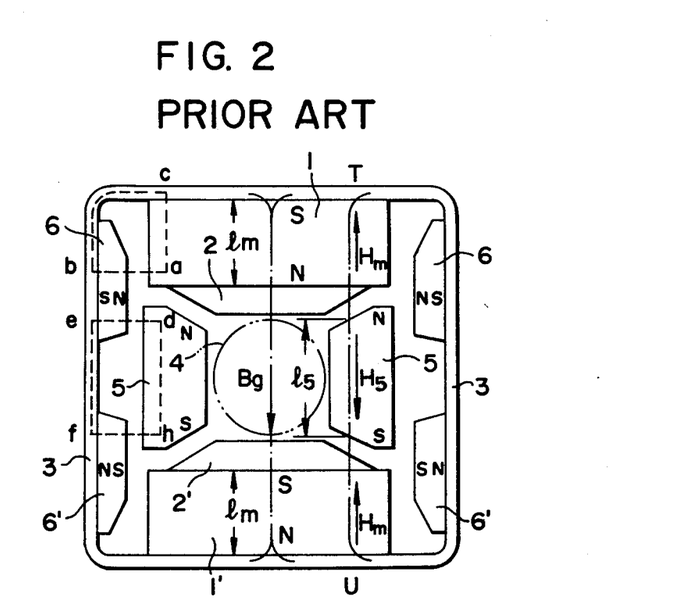
FIG. 2 is explanatory of a stator for conventional DC dynamo electric machines which is adapted to block leakage fluxes.

FIG. 2 is explanatory of a stator of a DC dynamo electric machine having the columnar coreless solid body rotor previously proposed by the present applicant. The illustrated structure blocks a large amount of leakage flux generated in a field magnetic path of the double-pole structure employing permanent magnets defining therebetween an extremely large air gap by applying a reverse magnetic field equivalent to the leakage field. Accordingly, the field flux is focused on the extremely large air gap to provide for a markedly increased ratio of the field flux to the overall flux of the main magnet, i.e. effective flux.

In FIG. 2, main magnets 1 and 1', which are ferrite or like permanent magnets of high coercive force, are disposed on the inside of a field yoke 3, and pole pieces 2 and 2' are respectively mounted on the main magnets 1 and 1' in opposed relation to a columnar coreless solid body rotor 4. In leakage magnetic paths which develop between the main magnets 1 and 1', blocking magnets 5 are respectively disposed. In a closed loop passing through the main magnet 1, the blocking magnet 5, the main magnet 1' and the yoke 3 along the line T-U, and letting flux of flux density designated as Bg in the air gap be positive in the direction indicated by the center arrow, letting lm and l5 represent the lengths of the main magnets 1 and 1' and the blocking magnet 5, respectively, and letting -Hm and H5 represent magnetic fields at the working points of the main magnets and the blocking magnet, respectively, the main and blocking magnets are selected such that $-2H_m \cdot l_m = H_5 \cdot l_5$. By doing so, the leadage magnetic field between the magnetic poles is blocked by a reverse magnetic field equivalent to the leakage magnetic field. Leakage magnetic fields between each main magnet and the side of each pole piece and between the main magnet and the yoke and a leakage magnetic field between each blocking magnet 5 and the yoke 3 are similarly blocked with blocking magnets 6 and 6' by adopting the abovesaid method in connection with broken-line closed loops a-b-c and d-e-f-h. With such an arrangement, the ratio of field flux $\Phi_g$ to the overall flux $\Phi_m$ of the main magnet, that is, the effective flux could be increased up to 70% under the otherwise unfavorable condition of the extremely large air gap.

SUMMARY OF THE INVENTION

This invention has for its object to provide a highly efficent and economical stator for DC dynamo electric machines. This is achieved by simplifying construction over the previously proposed stator structure to reduce the manufacturing cost and by more efficiently utilizing the permanent magnet in the limited space for forming a field system that provides a maximum magnetic field between field magnetic poles disposed opposite a solid body rotor.

Briefly stated, this invention is directed to a permanently magnetic stator for DC dynamo electric machines which is designed to define an extremely large air gap between pole pieces disposed opposite a nonmagnetic or substantially non-magnetic columnar solid body rotor. Two rectangular-shaped main permanent magnets are mounted on the inside of a square-shaped yoke in opposed relation to each other to set up a double-pole magnetic field. On the opposed surface of the main magnets are respectively mounted plate-like pole pieces so that a magnetic field along the line between the centers of the pole pieces and a leakage magnetic field on either side of the extremely large air gap are parallel to each other. A blocking magnet, which generates a reverse magnetic field equal to the leakage magnetic field, is mounted on the inside of the yoke on each side of the extremely large air gap, thereby ensuring to provide a strong magnetic field in the extremely large air gap.

DESCRIPTION OF THE PREFERRED EMBODIMENTS

Figure 3:
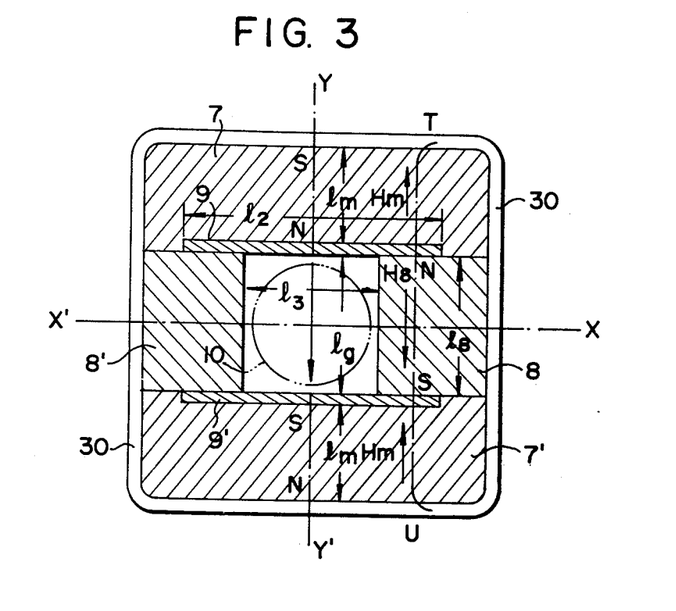
FIG. 3 is a sectional view illustrating a first embodiment of this invention.

FIG. 3 is explanatory of a first embodiment of this invention. In the case of using, for example, a barium ferrite, strontium ferrite or like anisotropic permanent magnet as a field magnet, the flux density Bd at the working point of the field magnet is low. Accordingly, if a high flux density is required between field magnetic poles, it is necessary to select a large cross-sectional area for the permanent magnet. A square-shaped field structure is suitable for efficient utilization of the effective cross-sectional area of the anisotropic permanent magnet. The illustrated embodiment employs a simple structure of a double-pole field system which comprises four anisotropic permanent magnets 7, 7', 8 and 8' rectangular in cross section and two plate-like magnetic pole pieces 9 and 9' disposed on the inside of a field yoke 30 having a square cross section. As will be described hereinafter, magnets 7 and 7' are main magnets and magnets 8 and 8' are blocking magnets. The field yoke 30 is shown to be composed of two yokes of U-shaped cross section which are combined to form a unitary structure having the square cross section as a whole, but the field yoke 30 may also be a single square-shape unitary structure. On the inside of the field yoke 30 are mounted the two main magnets 7 and 7' which are barium ferrite, strontium ferrite or like anisotropic permanent magnets of high coercive force. The pole pieces 9 and 9', preferring compressing pure iron, are respectively disposed in recesses which are formed in the opposed surface areas of the main magnets 8 and 7' to extend in the perpendicular direction with respect to the drawing sheet (FIG. 3).

The flux density Bd at the working pont of each of the main magnets 7 and 7' is low. Consequently, if a high flux density is needed or desired between the pole pieces 9 and 9' across a rotor 10, with $l_D$ representing the length of each pole piece in the direction perpendicular to the drawing (FIG. 3) and $l_2$ the width of each pole piece (FIG. 3) sheet, it is necessary to maximize the area A of the pole piece ($l_2 \times l_D = A$). If the area of that portion of the pole piece facing toward the rotor 10 is represented by $l_3 \times l_D = Ap$ and the flux density in the space lg between those portions of the pole pieces 9 and 9' is represented by Bg, it follows that $$Bd \cdot A/Ap = Bg \quad (1)$$

In FIG. 3, if the pair of blocking magnets 8 and 8' are removed, excessive leakage fluxes are generated between the pole pieces 9 and 9' and between the main magnets 7 and 7', making it impossible to center the flux of each main magnet at the space or air gap between those portions $l_3$ of the pole pieces 9 and 9' which are opposed to the rotor 10. To avoid this, in the present invention, there are disposed between the north and south poles of the main magnets 7 and 7' the pair of blocking magnets 8 and 8' of rectangular cross section which are anisotropic permanent magnets for cancelling leakage magnetic field between the north and south poles of the main magnets.

If the Ampere's circuital integral law is applied, in the CGS unit system, to a closed loop passing through the yoke 30, the main magnet 7, the blocking magnet 8, the main magnet 7' and then the yoke 30 along line T-U in FIG. 3, a conservative field results. Accordingly, the curvilinear integral of this closed loop is zero. The curvilinear integral also is assumed to be positive in the direction indicated by the center arrow along the YY' axis in the space lg. The magnetic fields at the working points of the main and the blocking magnets are represented by Hm and $H_8$, respectively. As the permeabilities of the pole pieces 9 and 9' and the yoke 30 can be selected to be about $10^3$, if this is omitted, it follows that $$\oint H \cdot ds = \int_{l_8} H_8 \cdot dl - 2 \int_{l_m} Hm \cdot dl = 0 \quad (2)$$
$$H_8 \cdot l_8 = 2Hm \cdot lm$$
$$H_8 = 2Hm \cdot lm/l_8 [Oe]$$

Thus, the leakage magnetic fields between the field magnetic poles can be blocked.

As described above, since the flux density at the working point of the main magnet is low and in order to provide a high flux density between the magnetic poles opposed to the rotor, it is necessary to maximize the cross-sectional areas of the main magnets 7 and 7' and the pole pieces 9 and 9' perpendicular to the direction of the magnetic field. In this invention, as shown in FIG. 3, the main magnets 7 and 7' are each disposed in the yoke 30 over the entire width thereof, and the pole pieces 9 and 9' are wide as indicafted by $l_2$.

A description will be given next with regard to the blocking of leakage fluxes between both the right- and left-hand end portions of the pole pieces 9 and 9' and the yoke 30 in the x-x' direction and the influences which are exerted on the magnetic fields of the main magnets 7 and 7' and the blocking magnets 8 and 8' in the y-y' direction by disposing them directly on the inside of the yoke 30.

If a magnetic field H established by a permanent magnet is a conservative field having a potential Vm, it is expressed as a negative gradient of the scalar quantity of the magnetic potential Vm.

$$H = -\text{grad} Vm$$

The general equation expressing the magnetic potential is as follows:

$$Vm = - \int_b^{\bar{a}} Hl \cdot dl \text{ [gilbert]} \quad (3)$$

Accordingly, the potential Vm indicates a change in the magnetic field.

Figure 4:
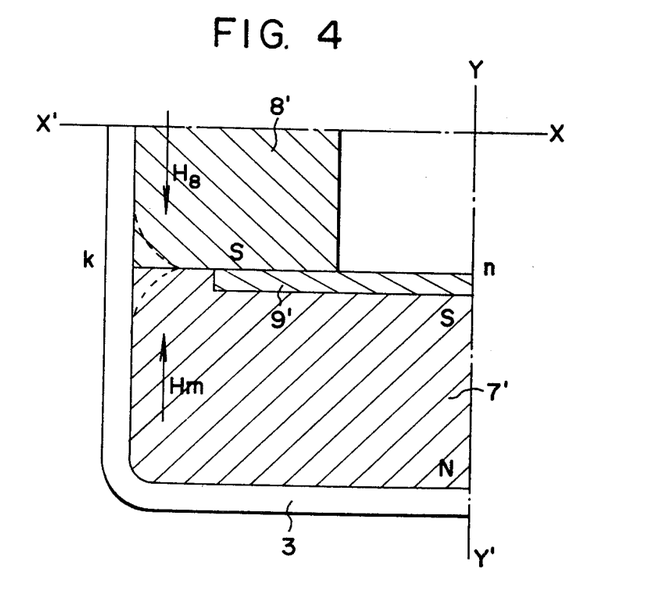
FIG. 4 is a sectional view showing a quarter part of the embodiment depicted in FIG. 3.

FIG. 4 is an enlarged view of the left-hand lower quarter portion of the structure of FIG. 3. In FIG. 4, the parts corresponding to those in FIG. 3 are identified by the same reference numerals. The arrows Hm and $H_8$ indicate the directions of magnetic fields set up by the main magnet 7' and the blocking magnet 8' respectively. The broken lines designated 8 in FIG. 4 indicate changes in the magnetic potentials Vm of the main magnet 7' and the blocking magnet 8' which are caused by the magnetic influence of the yoke 30 extending in parallel to the magnetic fields of the magnets 7' and 8'. The anisotropic ferrite magnet has a permeability of about 1.1 which is substantially equal to that in the or air gap. Accordingly, under the magnetic influence of the yoke 30, the magnetic potential Vm is high at the junction between the main magnet 7' and the blocking magnet 8', indicated by the line n-k, and gradually decreases as the yoke 30 is approached, as indicated by the lines 8. The left-hand end portion of the pole piece 9', however, is surrounded by those regions of the main magnet 7' and the blocking magnet 8' in which the magnetic potential Vm is not reduced, that is, the abovesaid left-hand end portion is held at the same magnetic potential as the junction between the magnets 7' and 8'. Consequently, leakage flux from the pole piece 9' to the yoke 30 in the x-x' direction can be blocked. In addition, as seen from the variation of the magnetic potential Vm, lowering of the magnetic force, which is caused by the arrangement of the main magnet 7' and the blocking magnet 8' being mounted directly on the interior surface of the yoke 30, is limited only to a small region; therefore efficient use of the main magnet in the limited space is ensured, that is, the effective cross-sectional area of the main magnet is maximized.

In FIG. 3, the magnetic fields of the main magnets 7 and 7' extend in the y-y' direction, and at the interface between the main magnets 7 and 7' and the pole pieces 9 and 9', the vertical components of magnetic induction B are continuous. Accordingly, if the flux density at the working point of each main magnet is represented by Bd, magnetic induction vertical to the boundary plane of each pole piece has the same value as the magnetic induction Bd.

Since leakage magnetic fields between the pole pieces 9 and 9' and the main magnets 7 and 7' are blocked by the pair of blocking magnets 8 and 8', as expressed by the equation (2), the flux density Bg over the width $l_3$ of each pole piece opposed to the rotor is given by $Bg = Bd \cdot A/Ap$, as shown by the equation (1), where A is the total area of the pole piece and Ap is the area of that portion of the pole piece facing the rotor. As a consequence, the pole piece serves to converge flux of the flux density Bd on the pole piece portion along width $l_3$. If the magnetic field at the working point of each of the main magnets 7 and 7' is taken as Hm and if the magnetic resistances of the yoke 30 and the pole pieces 9 and 9' are neglected, the magnetic field Hg in the air gap in the closed loop passing through the yoke 30 and the main magnets 7 and 7' along the line y-y' on the center of the rotor 10 is given as follows:

$$\oint H \cdot dl = \int_{lg} Hg \cdot dl - 2 \int_{lm} Hm \cdot dl = 0 \quad (4)$$

-continued
$$= H_g l_g - 2H_m l_m = 0$$
$$H_g = 2H_m \cdot l_m/l_g$$

In the case of employing the aforementioned columnar coreless solid body rotor, Hg of the equation (4) is equal to Bg of the equation (1). Further, in the case of using a columnar rotor having a low permeability of 2, for example, if the mean converted permeability between the field magnetic poles resulting from the rotor is taken as Z for the sake of simplicity, the field magnets are set from the relationship between the equations (4) and (1) so that $Z \cdot Hg = Bg$.

The field system structure described above can be magnetized by inserting a magnetizing coil between the pole pieces after assembling the field system. However, since permanent magnets of high coercive force are used and since their cross-sectional areas are large relative to the cross-sectional area of the yoke, a strong magnetic field would be required for the magnetization of the field system. Accordingly, in this method, it would be necessary to increase the thickness of not only the yoke 30 but also the pole pieces 9 and 9' to a size so large that they would not be saturated by the strong magnetic field used for the magnetization. Such increased thicknesses are not necessary in systems using permanent magnets and would result in a decrease in the size of the permanent magnets that could be used in the limited space of the yoke in which the field system is formed. With the abovesaid method of magnetization, it is impossible also to completely magnetize the entire anisotropic permanent magnet in the same direction.

To avoid the above problems, preferably the main magnets 7 and 7' and the blocking magnets 8 and 8' which are each formed with a simple rectangular anisotropic permanent magnet because of its high coercive force and weak self-demagneticing action and are each entirely magnetized in the same direction before assembling. After these steps the magnets are assembled with the field yoke, thus establishing the field system composed of ideally magnetized premanent magnets.

With this invention, in the case where barium ferrite, strontium ferrite or like anisotropic permanent magnets of high coercive force and low flux density Bd at their working points are disposed in the limited space of the field system and a large air gap between field pole pieces is employed as an equivalent low permeability space or air gap, the excessive leakage magnetic fields formed between the main magnets and the field pole pieces and between the field pole pieces and the yoke and blocked. At the same time, the permanent magnets are utilized most efficiently within the limited space, and manufacturing cost is reduced by the simplification of the field system structure including the permanent magnets.

Figure 5:
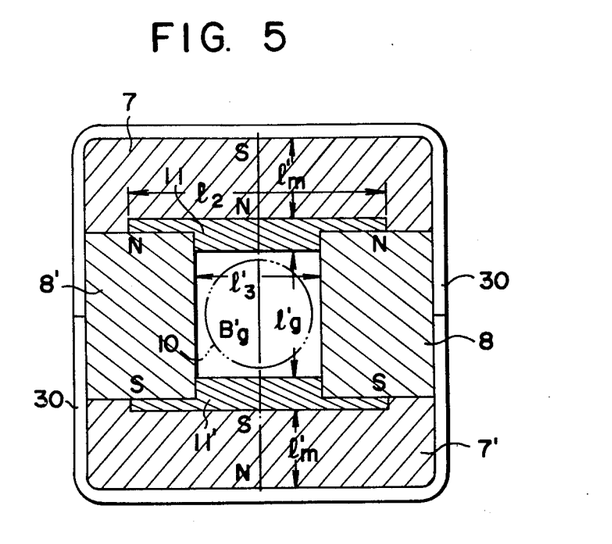
FIGS. 5 and 6 are sectional views illustrating second and third embodiments of this invention, respectively.

FIG. 5 is explanatory of a second embodiment of this invention, in which the parts corresponding to those in FIGS. 3-4 are identified by the same reference numerals and characters. In this second embodiment the field flux density Bg' is higher than the flux density Bg in the first embodiment depicted in FIG. 3. The illustrated second embodiment differs from the FIG. 3 embodiment in the configuration of each of magnetic pole pieces 11 and 11', with the width l'3 representing that area of each pole piece facing the rotor and the length l'g representing the air gap. The ratio A/Ap in the equation (1) for the FIG. 5 embodiment, in other words, is larger and the air gap length l'g is as compared with that of FIG. 3. H'g corresponding to Hg of the equation (4) is larger than in the first embodiment since the ratio of l'g to 2l'm is reduced. In FIG. 5, the pole pieces are shown to have flat surfaces opposed to the rotor but these surfaces may also be curved in the case of using a rotor having a predetermined permeability.

Figure 6:
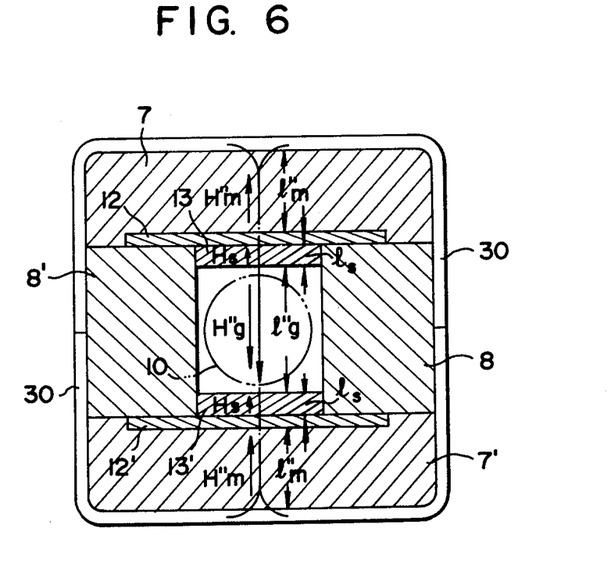

FIG. 6 is explanatory of a third embodiment of this invention, in which the parts corresponding to those in FIGS. 3 through 5 are identified by the same reference numerals and characters. For example, a permanent magnet of the samarium type has a high coercive force and a large energy product but is expensive. Accordingly, this permanent magnet is very effective for forming a very small magnetic path but uneconomical as a main magnet for applying a strong magnetic field to such an extremely large air gap as mentioned above.

In this embodiment, the main and blocking magnets for the field magnetic path of the extremely large air gap are composed of anisotropic barium ferrite, strontium ferrite or like permanent magnets to block a large amount of inevitably resulting leakage flux and hence concentrate flux between field magnetic pole pieces 12 and 12' disposed opposite the rotor, as is the case with the first embodiment. High coercive force permanent magnets 13 and 13' of the samarium type are respectively mounted on the pole pieces 12 and 12'. With such an arrangement, a very strong composite magnetic field is set up in the extremely large air gap, and a very economical field magnetic path is obtained.

In FIG. 6, l''m, ls, l''g represent the lengths of the main magnets 7 and 7' and the permanent magnets 13 and 13' of the samarium type and the air gap length along the center line of the field system, respectively, while H''m, Hs and H''g represent the magnetic fields at the working points of the main magnets 7 and 7' and the samarium permanent magnets 13 and 13' and in the air gap, respectively. If the magnetic resistances of the pole pieces 12 and 12' and the yoke 30 are neglected and if the direction indicated by the arrow on the center line in the air gap is assumed to be the positive direction of flux, the circuital integral of the closed loop [yoke 30—main magnet 7—permanent magnet 13—air gap—permanent magnet 13'—main magnet 7'—yoke 30] along the center line of the field system is as follows:

$$\oint H \cdot dl = \int_{l''g} H''g \cdot dl - 2\int_{l_s} H_s \cdot dl - 2\int_{l''m} H''m \cdot dl = 0 \quad (5)$$
$$= H''g \cdot l''g - 2H_s \cdot l_s - 2H''m \cdot l''m = 0$$
$$H''g \cdot l''g = 2(H_s \cdot l_s + H''m \cdot l''m)$$
$$H''g = 2(H_s \cdot l_s + H''m \cdot l''m)/l''g$$

As expressed by the above equation (5), the composite magnetic field composed of the magnetic field of the main magnet obtained by blocking leakage flux and the magnetic field of the samarium permanent magnet is centered at the air gap portion to establish a strong magnetic field in the extremely large air gap. In this case, the relationship between the magnetic field H''g in the air gap and the cross-sectional area A of the main magnet is similar to that in the first embodiment, and in the case of the columnar coreless solid body rotor, H''g=B''g. The third embodiment is different from the first embodiment in that the difference between B''g and the flux density Bd at the working point of the main magnet is large and in that the ratio A/Ap in the equation (1) is also large. If the flux density Bd is made equal to that in the first embodiment, the cross-sectional area of the main magnet in the third embodiment is larger than that in the first embodiment, and consequently the field system structure is also larger. In the third embodiment using a columnar rotor of low permeability, $Z'$ represents the mean converted permeability between the field pole pieces resulting from the rotor, $Z' \cdot H''g = B''g$. Based on the relationship between the equations (5) and (1), therefore, the cross-sectional area and the construction of the main magnet are set, as is the case with the first embodiment.

As has been described in the foregoing, according to this invention, in a DC dynamo electric machine which employs a low-inertia, low-permeability columnar rotor or a columnar coreless solid body rotor having a closely stacked winding and in which the space defined between the main magnets is regarded as an equivalently low permeability space or air gap, blocking magnets for blocking leakage flux are disposed between the main magnets, between the pole pieces and between the pole pieces and the field yoke, respectively. With such an arrangement, a strong magnetic field can be applied to the rotor, and consequently a highly efficient DC dynamo electric machine can be realized. Since the main magnets are rectangular in cross section, they can be easily produced, and since they are closely packed in the field yoke having a squared-shaped cross section, the space in the yoke is utilized with high efficiency.

This invention is not limited specifically to the foregoing embodiments, but many modifications and variations may be effected. For example, the main magnets or blocking magnets need not always be anisotropic permanent magnets but may also be isotropic ones.

What is claimed is:

1. A stator for a DC dynamo electric machine comprising:
    a square-shaped yoke;
    a pair of main magnets oppositely disposed in said square-shaped yoke for forming a magnetic field in an air gap defined between said two magnets;
    a non-magnetic or substantially non-magnetic columnar solid body rotor positioned between said two magnets for establishing an extremely large air gap between said two magnets;
    plate-like pole pieces mounted on respective opposing areas of said main magnets facing said rotor for establishing a double-pole intensified magnetic field in said extremely large air gap parallel to leakage magnetic fields developed on both sides of said extremely large air gap between said main magnets; and
    a pair of blocking magnets oppositely disposed in said yoke between said two main magnets on the sides of said extremely large air gap for generating magnetic fields reverse in direction and equal in intensity to said leakage magnetic fields developed on the sides of said extremely large air gap, wherein said blocking magnets cancel the leakage magnetic flux to provide an effective strong magnetic field in said extremely large air gap.

2. A stator for a dynamo electric machine according to claim 1, wherein said pole pieces are narrower in width than the opposed areas of said main magnets but wider than the space between said opposed blocking magnets and are partly held between said main magnets and said blocking magnets at the same magnetic potential as said magnets.

3. A stator for a DC dynamo electric machine according to claim 1, wherein those portions of said pole pieces facing the rotor are thicker in cross-section than the portions held between said main magnets and said blocking magnets.

4. A stator for a DC dynamo electric machine according to claim 1, wherein a piece of a high coercive force permanent magnet is mounted on that portion of each of said pole pieces facing the rotor.

5. The stator for a DC dynamo electric machine according to claim 4, wherein said high coercive force permanent magnet is of the salarium type.

6. The stator for a DC dynamo electric machine according to claim 1, wherein said main magnets and blocking magnets are selected from a group comprising barium ferrite, strontium ferrite, or like anisotropic permanent magnets.

7. The stator for a DC dynamo electric machine according to claim 1, wherein said main magnets and blocking magnets have rectangular-shaped cross-sections.

8. The stator for a DC dynamo electric machine according to claim 7, wherein each main magnet is disposed directly along the entire inside width of said yoke.

9. The stator for a DC dynamo electric machine according to claim 8, wherein each pole piece is disposed along a substantial portion of the entire width of said main magnet on which said pole piece is mounted.

10. The stator for a DC dynamo electric machine according to claim 9, wherein each blocking magnet is disposed directly along the inside surface of said yoke between the pair of said main magnets.

11. The stator for a DC dynamo electric machine according to claim 10, wherein the end portions of each said pole piece are surrounded by those portions of said main and blocking magnets in which magnetic potential is not reduced and is substantially the same as said magnets.

12. A stator for a DC dynamo electric machine comprising:
    (a) a square-shaped yoke;
    (b) a pair of main magnets of rectangular-shaped cross-section oppositely disposed along the entire inside width of said yoke for forming a magnetic field in an air gap defined between said two magnets;
    (c) plate-like pole pieces mounted on respective opposing areas of said main magnets facing said rotor for establishing a double-pole intensified magnetic field in said air gap parallel to leakage magnetic fields developed on both sides of said air gap between said main magnets;
    (d) a non-magnetic or substantially non-magnetic columnar solid body rotor positioned between said opposed main magnets for forming an extremely large air gap between said two magnets; and
    (e) a pair of blocking magnets of rectangular-shaped cross-section oppositely disposed along the inside surfaces of said yoke between said main magnets on the sides of said extremely large air gap for generating magnetic fields in reverse direction and equal in intensity to the leakage magnetic fields developed on the sides of said extremely large air gap, wherein said blocking magnets cancel the leakage magnetic flux to provide an effective strong magnetic field in said air gap.

13. The stator of claim 1 or 12 wherein each of said main magnets has a recess formed in the surface facing the air gap and wherein the respective plate-like pole piece is positioned in the magnet recess.

14. The stator of claim 13 wherein each of said blocking magnets is positioned directly against and between said two main magnets and portions of said plate-like pole-pieces facing each other.

15. The stator of claim 1, 7 or 12 wherein said plate-like pole pieces have ends substantially perpendicular to the sides facing said rotor.

* * * * *

UNITED STATES PATENT AND TRADEMARK OFFICE
CERTIFICATE OF CORRECTION

PATENT NO. : 4,243,903  Page 1 of 3

DATED : Jan. 6, 1981

INVENTOR(S) : Matsuo Mishima

It is certified that error appears in the above-identified patent and that said Letters Patent are hereby corrected as shown below:

Front page, [56] References Cited, "Graffenried et al." should be --de Graffenried et al.--.

Drawings, Sheet 2 of 3, FIG. 3 should be:

FIG. 3

Drawings, Sheet 2 of 3, FIG. 4 should be:

UNITED STATES PATENT AND TRADEMARK OFFICE
CERTIFICATE OF CORRECTION

PATENT NO. : 4,243,903

DATED : Jan. 6, 1981

INVENTOR(S) : Matsuo Mishima

It is certified that error appears in the above-identified patent and that said Letters Patent are hereby corrected as shown below:

FIG. 4

Column 1, line 18, delete "pole"; after "piece" insert --,--;
Column 1, line 49, after "2" delete ",".
Column 2, line 8, "magents" should be --magnets--;
Column 2, line 52, "Koher" should be --Kober--;
*Column 2, line 54, after "to" insert --de--;
*Column 2, line 60, before "Graffen-" insert --de--;
*Column 2, line 66, after "or" insert --de--.
Column 3, line 48, "leadage" should be --leakage--.

UNITED STATES PATENT AND TRADEMARK OFFICE
CERTIFICATE OF CORRECTION

PATENT NO. : 4,243,903

DATED : Jan. 6, 1981

INVENTOR(S) : Matsuo Mishima

It is certified that error appears in the above-identified patent and that said Letters Patent are hereby corrected as shown below:

```
*Column 4, line 56, "preferring" should be --preferably--;
*Column 4, line 67, delete "sheet".
*Column 6, line 12, "8" should be --q--;
*Column 6, line 18, before "or" insert --space--;
*Column 6, line 23, "8" should be --q--;
 Column 6, line 68, "fH" should be --∅--.
 Column 7, line 35, delete "which";
 Column 7, line 37, "self-demagneticing" should be --self-
     demagnetizing--;
 Column.7, line 51, "and" should be --are--;
 Column 7, line 68, after "is" insert --shorter--.
*Column 9, line 23, "squared-shaped" should be --square-shaped--.
```

Signed and Sealed this

Ninth Day of June 1981

[SEAL]

Attest:

RENE D. TEGTMEYER

Attesting Officer     Acting Commissioner of Patents and Trademarks